INVENTOR:
WILHELM KNAPP
BY
Karl F. Ross
ATTORNEY

United States Patent Office 3,423,134
Patented Jan. 21, 1969

3,423,134
HYDRODYNAMIC AND HYDRAULIC BRAKE SYSTEM FOR HEAVY-DUTY MOTOR VEHICLES
Wilhelm Knapp, Bad Homburg, Germany, assignor to Alfred Teves G.m.b.H., Frankfurt am Main, Germany, a corporation of Germany
Filed Nov. 6, 1967, Ser. No. 680,936
Claims priority, application Germany, Nov. 12, 1966, T 32,506
U.S. Cl. 303—2                        18 Claims
Int. Cl. B60t 13/14; F16d 51/08, 57/00

ABSTRACT OF THE DISCLOSURE

A hydrodynamic brake system for an automotive vehicle having a set of driven wheels, a set of nondriven wheels and a hydrodynamic brake connected with the power train to the driven wheels, the system including mechanism responsive to the driven-wheel brake torque developed by the hydrodynamic brake and the nondriven-wheel brake pressure for controlling the brake pressure at the rear wheels in proportion to the difference of the two. The mechanism includes a valve connected between the valve cylinder and the driven-wheel brake cylinders or a differential piston forming part of the master cylinder.

---

My present invention relates to a hydrodynamic brake system in conjunction with the hydraulic wheel brakes of heavy-duty automotive vehicles whereby the kinetic braking energy of the hydrodynamic brake is exploited in addition to a friction braking of the wheels of the vehicle.

It has already been proposed to provide hydrodynamic-brake or decelerator systems for restricting rotation of the shaft (e.g. the drive shaft of an automotive vehicle) relative to a stationary decelerator member. For the most part, drive shafts of this character are connected in the power train connected with driven wheels of the vehicle, generally through a differential. To permit relative vertical movement of the driven wheels and the vehicle body, the power shaft is provided at its ends with so-called "universal" joints or couplings (which can also be designated as cardan joints), the power shaft being known as a "cardan shaft." In such hydrodynamic decelerators, the system generally comprises a rotor in the form of a half shell connected with the shaft to be braked and a complementary shell half forming the stator and mounted upon a support. The shells define between them an annular chamber which can be constituted from a multiplicity of segmental compartments whose vanes circulate a hydraulic fluid by pumping action through a heat exchanger in which the heat generated by the pumping action is dissipated. When hydraulic fluid is supplied to this decelerator, friction is created by the pumping action to produce heat in dependence upon the degree of impediment by the fluid to rotation of the shaft, this heat being referred to hereinafter as "kinetic braking heat." In some cases, a separate heat exchanger is provided to dissipate the thermal energy of the braking action into the atmosphere, although a more common technique, as described and claimed in my copending application Ser. No. 672,121 filed Oct. 3, 1967, and entitled "Hydrodynamic Brake System for Motor Vehicles," is to dissipate the thermal braking energy by indirect liquid-liquid heat transfer into the cooling system of a water-cooled automotive engine.

Such system find their most practical utility in heavy-duty vehicles such as track and chain-driven vehicles, front-end loaders, towing tractors, back hoes and the like and with heavily laden trucks and semitrailers which are difficult to slow solely with friction brakes, especially in downhill travel. In the aforedescribed systems, a hydraulic decelerator is used to provide liquid-friction braking at the most effective point, i.e. at relatively high vehicle speeds, with the final brake action resulting from conventional mechanical-friction wheel braking. Brakes of the latter types are most effective after the vehicle has initially been slowed. Systems of this character are described in the commonly assigned Patents No. 3,165,162 issued Aug. 9, 1966, and No. 3,302,655 issued Feb. 7, 1967, as well as in the commonly assigned copending application Ser. No. 669,941 filed Sept. 22, 1967, entitled "Brake System."

In the prior patents and application mentioned above, the vehicle-brake system includes a hydraulic decelerator coupled with the shaft whose rotor cooperates with a stationary stator connected with the vehicle shaft for reducing the rotor speed upon the supply of hydraulic fluid under pressure to the decelerator. This system, as far as it goes, is incapable of bringing the shaft to standstill. Thus, the patentees provide a fluid-responsive mechanical-friction brake in the decelerator housing, the brake being hydraulically actuatable for frictionally interconnecting the relatively rotatable decelerator members. For the purposes of the aforedescribed patented systems and for the purposes of the present application as far as the decelerator structure is concerned, reference may be made to U.S. Patents No. 1,297,225 and No. 2,241,189 which illustrate and describe rotor and stator constructions which are also applicable here.

In the application Ser. No. 669,941 mentioned earlier, it has been pointed out that prior-art hydrodynamic brakes had a significant disadvantage in that even when the decelerator was not actuated by fluid pressurization, some pumping action continued and gave rise to fluid loss, mechanical breakdown of the liquid and some power loss. Accordingly, that application provides for the deenergization of the hydrodynamic brake by applying a reduced pressure to a charging cylinder or, conversely, to the charging of the hydrodynamic brake by gas-pressurization of this cylinder.

In this application and the commonly assigned copending application Ser. No. 668,462 of Sept. 18, 1967, the relationship between the hydrodynamic-braking effectiveness and the wheel-braking effectiveness is described. Thus, in those systems, a feedback arrangement is provided between the hydraulic decelerator and the control means, namely, a brake master cylinder, to ensure that the brake force applied to the shaft and the wheels remains constant. It will be understood that the hydrodynamic brake is effective to decelerate the rear wheels in the vehicle, these wheels being normally powered through the cardan shaft. Since the rear-wheel brakes operate as well upon these wheels, it is advantageous to balance the hydrodynamic braking effectiveness and the friction-braking effectiveness to maintain, upon application of a given pressure to the brake pedal, a constant total brake force. The feedback means there described comprises a servo mechanism which is connected by a hydraulic line to deliver a control pulse to a servo valve connected between the master cylinder and the rear-wheel brake cylinder.

In connection with hydrodynamic decelerating devices, it has been found that imbalance is created by virtue of the fact that the brake torque applied by the hydrodynamic brake acts only at the rear wheels or, more generally speaking, at the driven pair of wheels when only one set of wheels is coupled with the engine. As a consequence, the hydrodynamic decelerator may be considered as intensifying the braking action at the rear wheels without corresponding increase in the braking effectiveness of the front wheels. To prevent skidding, oversteering and other inconveniences arising from improper distribution of the braking force, a variety of systems have been provided none of which, to the knowledge of the applicant, has succeeded in ensuring a proper balance when hydrodynamic brakes are employed.

It is, therefore, the principal object of the present invention to provide an improved system for braking heavy-duty automotive vehicles which includes a hydraulic decelerator.

Another object of my invention is to extend the principles originally set forth in the last-mentioned copending applications to uniform and balanced operation of separate sets of wheel brakes.

I have now found that it is possible to overcome the disadvantages of earlier hydrodynamic-brake systems by providing, an automotive-vehicle brake system having a hydrodynamic brake with a stator of limited rotatability, a rotor rotatable relatively to the stator and cooperating therewith to pump a hydraulic braking fluid along a transport path and a heat exchanger along this path for dissipating hydrodynamic brake energy, the stator being provided with a servo transmitter in the form of a piston-and-cylinder arrangement which, in turn, cooperates with the vehicle master cylinder and a control arrangement to apply to the front-wheel brakes of the vehicle a brake force corresponding substantially to the sum of the brake moment effective at the rear wheels and developed by the hydraulic decelerator and the frictional brake force applied to the rear wheels.

Thus, according to a specific feature of this invention, the rear-wheel frictional force will correspond to the difference between the front-wheel brake pressure and the brake moment as generated by the hydrodynamic brake at the rear wheels and as represented by a fluid pressure.

According to a more specific feature of this invention, a fluid-responsive servo transmitter is connected with the hydrodynamic brake to sense the reaction torque, fluid pressure within the brake or the like for operating a proportioning member of a fluid-responsive character. Thus the proportioning member may be a valve biased by the pressure of the servo transmitter and connected between the master cylinder and the wheel-brake cylinders of the driven set of wheels or a floating piston of the master cylinder which is pressurized on one side at the front wheel (nondriven) wheel-brake pressure and on its other side by the servo transmitter pressure and the rear-wheel (driven) wheel-brake pressure.

It has also been found that the operating threshold can be accelerated and the system made more responsive to the requirements of the driver who is not able to tell, until some braking has occurred, how to operate the brakes for the particular ratio of front wheel, hydrodynamic brake and rear wheel deceleration. Accordingly, I provide a differentially operable mechanism, in addition to the servo receiver described earlier, which is energized on one side by the rear-wheel brake pressure and, on the other side, by the servo transmitter pressure which is proportional to the brake moment developed by the hydraulic decelerator. This differential mechanism may include a valve connected between the charging cylinder and the hydrodynamic brake and shiftable by a pair of oppositely effective hydraulic cylinders in accordance with a difference in the pressures applied thereagainst or, by electrical circuitry which may operate oppositely effective coils from a differential switch whose diaphragm defines chambers on opposite sides of a casing which are respectively connected with the servo transmitter and the rear-wheel brake line. Of a special advantage has been found to be the use of a switch upon the brake pedal or coupled therewith for energizing the circuitry controlling the valve. Thus the switch may simply render the hydrodynamic brake effective or, especially when a snap-type switch which maintains contact while the return stroke of the pedal is delayed, is used, it may directly operate the solenoid of the valve to place the automatic differential switch in operation. It has also been found to be desirable to provide a three-chamber switch in which one contact is a double-acting member and responsive to the pressure differential indicated earlier while another contact is effective only in one direction and is closed upon the development of a pressure within the chamber connected with the mechanical brakes of the driven wheels. In addition, the switch may remain effective under automatic or differential switch control, while contacts may be provided on the accelerator pedal to discharge the fluid from the hydrodynamic brake.

According to still another feature of this invention, a manual control is provided for operating the valve independently of the differential means and the brake pedal while a thermostatic switch is connected in the vehicle engine-cooling system in accordance with my earlier application to operate a switch for automatically discharging the hydrodynamic brake upon the development of excessive heat in the engine. Advantageously, the fluid-operated time-delay damper cooperates with the thermostatic switch closure while an electromagnetic coil is energizable to reopen the thermostatic switch upon its closure; this arrangement ensures incremental discharge of the hydrodynamic brake and precludes sudden changes in brake effectiveness and force distribution while nevertheless permitting cooling. Furthermore, the accelerator pedal switch ensures complete discharge of the hydrodynamic brake before any substantial acceleration of the engine occurs. It will be understood also that the three-chamber differential switch allows constant-rate braking as is desirable on long down-hill trips without strain on the vehicle operator. I have also found it desirable to provide a further set of contacts operable upon overloading of the vehicle and in the suspension between body and suspended portions for discharging the hydrodynamic brake when the vehicle is in an overloaded state, thereby preventing damage to the power train.

The above and other objects, features and advantages of the present invention will become more readily apparent from the following description, reference being made to the accompanying drawing in which.

Figure 1:
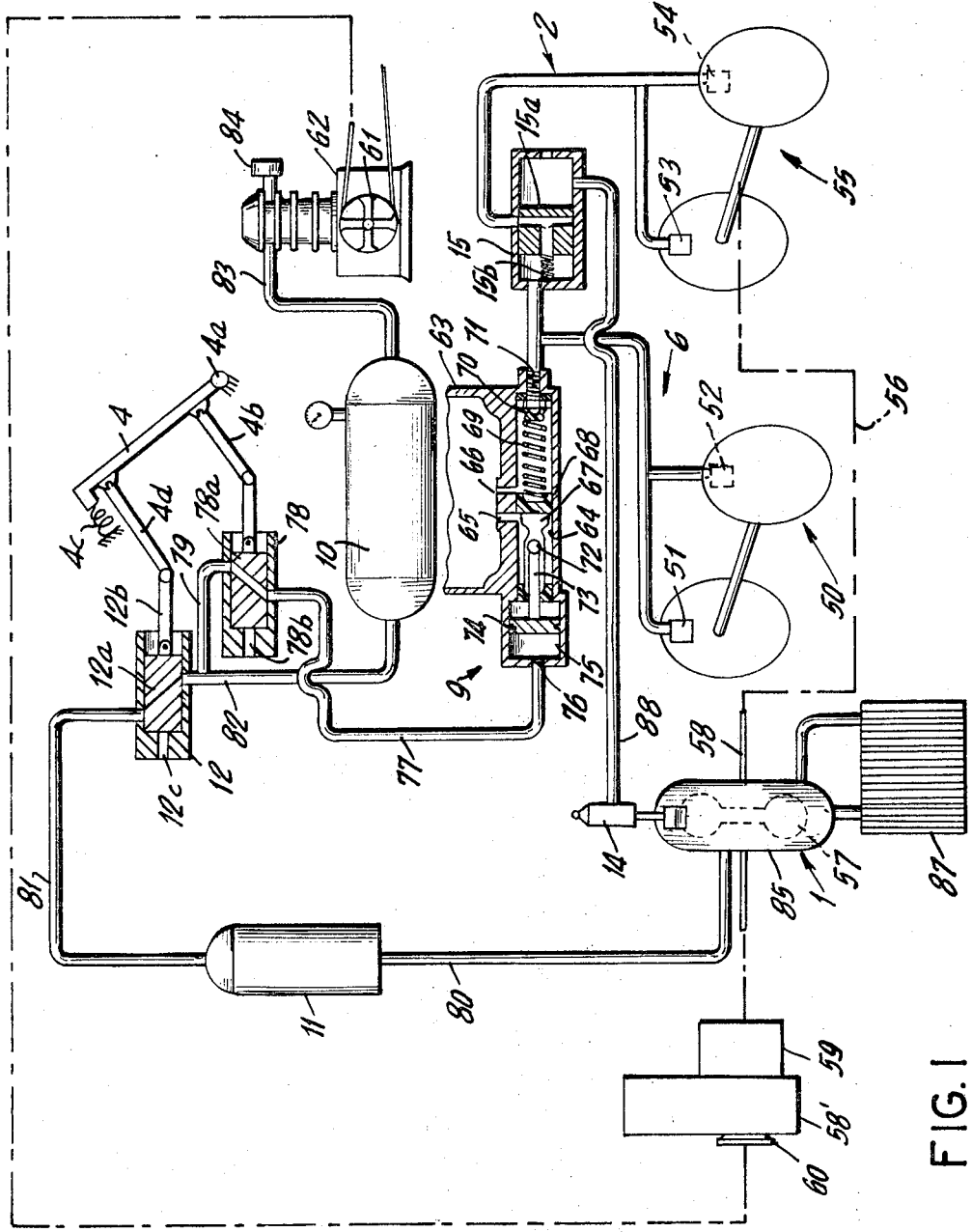
FIG. 1 is a flow diagram, partly in cross-section, of a hydrodynamic brake system embodying the present invention.

In FIG. 1, I show a brake system in which the vehicle is shown to have a set of front wheels 50 whose wheel-brake cylinders 51 and 52 operate internal-expansion or disk brakes of conventional design and are connected in a front-wheel brake network generally represented at 6. The rear-wheel network 2 delivers brake fluid to the wheel-brake cylinders 53 and 54 of the set of rear wheels 55 which are driven via the usual cardan shaft and universal joints as represented at 56; the rotor 57 of the hydrodynamic brake 1 has its shaft 58 connected with the cardan shaft. The engine of the vehicle is represented at 58′ and is shown to have a transmission 59 connected with the shaft 58 and the power train 56 for driving the rear wheels, as well as a pulley 60 serving to operate the belt drive 61 of an air compressor 62. A compresor of suitable construction is shown at pages 444 and 445 of Principles of Automotive Vehicles, U.S. Government Printing Office, Washington, D.C.

The fluid pressure for actuating the mechanical-friction brakes 51–54 is delivered by an air-actuated master cylinder 9 whose reservoir 63 supplies brake fluid to the cylinder bore 64 through the usual intake port 65 and bypass port 66. Within the master cylinder, I provide a piston 67 whose primary cup 68 drives fluid against the force of a return spring 69 past a check valve 70 into the networks 2 and 6 at the discharge port 71 of the master cylinder. The piston 67 has a socket 72 in which the ball-shaped head of a rod 73 is lodged. The rod 73 forms a piston 74 and is axially shiftable in an air-operated cylinder 75 to which pneumatic pressure is delivered at an inlet 76 behind the piston 74 and is designed to drive this piston to the right and express brake fluid from the chamber ahead of the piston. An air-delivery line 77 connects the air-operated cylinder 75, via a valve 78 and another line 79 with the outlet of a source of gas pressure 10, here shown as a compressed-air tank.

The brake pedal 4 of the vehicle is fulcrumed at 4a to the chassis and is connected by a link 4b to the valve member 78a of slide valve 78 thereby controlling the pressurization of master cylinder 9 in accordance with the degree of depression of the brake pedal 4 against the force of a spring 4c.

The hydrodynamic brake system of this invention includes the hydrodynamic decelerator 1, which may be of the type described and illustrated in the aforementioned patents and pending applications, which is chargeable with hydraulic fluid by a line 80 from a charging vessel 11 in which a gas head is sustained above the liquid. The charging vessel 11 is pressurized via a line 81 from a valve 12 operated by the brake pedal 4. It has been pointed out in some of the aforementioned copending applications that it is advantageous to withdraw fluid from the hydrodynamic brake 1 when the latter is in its idling state. In that case, a two-way valve may be provided at 12 for alternately connecting the cylinder 11 with the suction and pressure sides of the compressor 62. The valve 12 is shown in diagrammatic form to have a valve member 12a linked at 12b to a rod 4d articulated to the brake pedal. Air from the compressed air tank 10 is delivered to valve 12 by a line 82. The compressed-air tank is, moreover, connected to the pressure side 83 of the compressor 62 whose intake side 84 is provided with an air filter.

Figure 2:
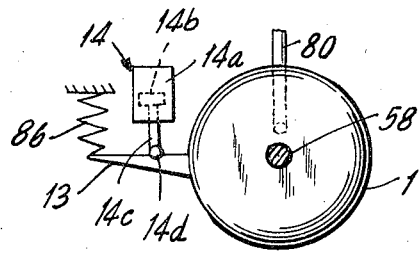
FIG. 2 is a diagrammatic side view of the hydrodynamic brake of FIG. 1.

As can be seen in FIGS. 1 and 2, the stator 85 of the hydrodynamic brake is mounted on the chassis with limited freedom of angular movement about the axis of shaft 58, i.e. with a mobility of a few angular degrees against the force of a spring 86 during operation of a hydrodynamic brake in the course of which hydraulic fluid is circulated through a heat exchanger 87 to dissipate the hydrodynamic braking heat. To this end, the stator 85 is provided with an abutment in the form of an arm 13 which bears upon the spring 86 and operates a servo transmitter 14 which, in turn, controls a servo-follower valve 15 with which it is connected via a fluid-transmission line 88. The servo transmitter, which generates a fluid pressure representative of the hydrodynamic brake moment, is here shown as a cylinder 14a affixed to a stationary portion of the vehicle body and having a piston 14b whose rod 14c is provided with an antifriction roller 14d bearing against the arm 13. As the braking effectiveness of hydrodynamic brake 1 increases the torque applied to the stator 85 increases proportionately to shift the piston 14b within the cylinder 14a to drive the valve member 15a of valve 15 to the left against the force of spring 15b and decrease the delivery of fluid to the rear-wheel brakes 53 and 54. The valve 15 is thus interposed between the master cylinder 9 and the rear-wheel cylinders 53, 54 between the point at which the front-wheel network 6 is connected to the master cylinder and the rear-wheel brakes 53, 54.

The system of FIGS. 1 and 2 operates in the following manner: During normal vehicle operation, the brake pedal 4 is not depressed and the engine 58′ drives the rear wheels 55 via a power train 56 and simultaneously operates the compressor 62 to generate air pressure in chamber 10. The charging cylinder 11 is vented to the atmosphere via a port 12c of valve 12 whose valve body 12a is in its right-hand position. The hydrodynamic brake 1 applies no braking moment to the cardan shaft 56. Furthermore, since the valve body 78a is also in its right-hand position, the air chamber 75 of the master cylinder 10 is vented to the atmosphere by port 78b. The master-cylinder piston 67 is thus in its extreme left-hand position under the action of spring 69.

When brake pedal 4 is depressed, the valve body 78a is shifted to the left, thereby connecting chamber 75 of the master cylinder 9 with the compressed-air tank 10 to drive the pistons 74 and 67 to the right and express fluid from the master cylinder 9 through the networks 6 and 2 of the front and rear brakes simultaneously and at identical pressures. Concurrently, the valve body 12a is shifted to the left to connect the cylinder 11 with the tank 10, thereby forcing liquid from cylinder 11 into the hydrodynamic brake 1. Under low-speed conditions, the hydrodynamic brake 1 is relatively ineffective and no significant torque is applied to the stator 85. For down-hill travel, high-speed braking and the like, the torque upon the stator 85 increases, thereby rotating the stator in the clockwise sense (FIG. 2) to an extent determined by the torque. The piston 14b is displaced to the right in proportion to this torque which also is a measure of the brake moment at the rear wheels produced by the hydrodynamic brake 1. The valve 15 is operated by the cylinder 14 to constrict brake-fluid flow from master cylinder 9 to the rear-wheel brake cylinder 53 and 54 so that the rear-wheel brake pressure is in effect the difference between the front wheel brake pressure as delivered by the master cylinder 9 to the valve 15 and a fluid pressure corresponding to the rear-wheel braking movement of the hydrodynamic brake as applied to the other side of the valve member 15a. Thus, similar brake moments are created at the front and rear wheels in spite of the fact that the hydrodynamic brake contributes only to the rear-wheel brakes.

Figure 3:
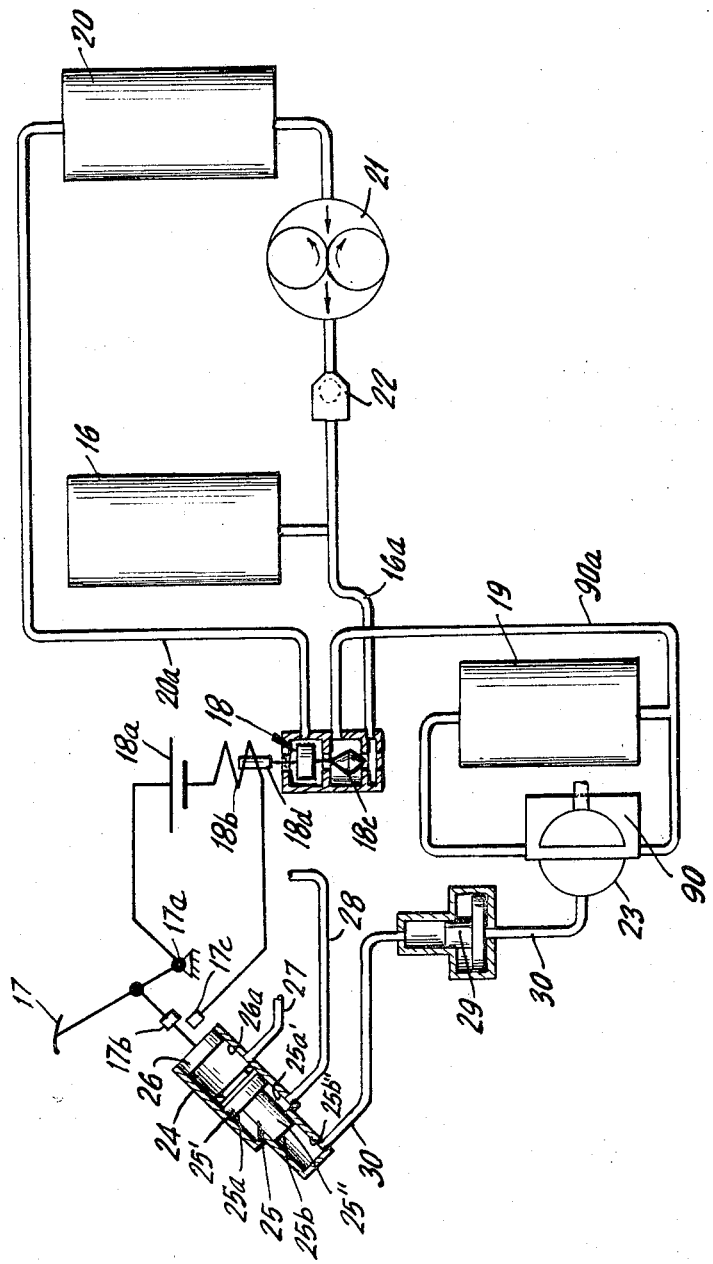
FIG. 3 is a diagram of a hydrodynamic brake system using an electrically operated valve.

In FIG. 3, I show a hydrodynamic brake 90 whose stator chamber is represented at 23 and cooperates with a rotor connected to the cardan shaft of a vehicle of the type illustrated in FIG. 1 whose front-wheel brakes are connected to the network 27 while its rear-wheel brakes are supplied via the line 28. In this embodiment, the tandem master cylinder 24 is operated by a brake pedal 17 fulcrumed at 17a to the vehicle body and actuating a piston 26 in a chamber 26a of the master cylinder which is connected by the line 27 to the front-wheel brakes as previously indicated. Ahead of this chamber 26a, there is provided a stepped piston 25 whose large-diameter step 25′ is effective in chamber 25a′ to displace brake fluid to the rear-wheel brakes via line 28. The effective piston surface is the annular face 25a. In addition, the stepped piston 25 has a small-diameter step 25″ working in chamber 25b″ which may be an air- or gas-filled chamber or connected with a gas-head hydraulic accumulator, e.g. of the type described on pages 86–89 of Fluid Power, U.S. Government Printing Office, 1966. The effective surface of the small-diameter step 25″ is represented at 25b and is dimensioned such that the sum of the surface areas of faces 25a and 25b is equal to the effective surface area in chamber 26a.

The hydrodynamic brake 90 is charged by a pressure accumulator 16 (pages 84–89 of Fluid Power, supra) via an electromagnetic valve 18 operated by the brake pedal 17. To this end, the brake pedal 17 carried a contact 17b connected to one terminal of a battery 18a which is returned through the solenoid coil 18b of the valve 18 to the other contact 17c which completes a circuit with contact 17b when the brake pedal 17 is depressed to cut in the hydrodynamic brake. The valve 18 further comprises a weighted valve member 18c connected to the armature 18d so that, when the circuit is closed, the valve body 18c is drawn upwardly. In its upper position, the valve 18 connects the supply line 90a for charging the hydrodynamic brake 90 with fluid under pressure with the line 16a of the accumulator 16. In its lower position, the valve 18 disconnects the accumulator from the hydrodynamic brake and connects the liquid reservoir 20 (via line 20a) with line 90a. The reservoir 20 is maintained under negative pressure and is connected to the suction side of a pump 21 which charges accumulator 16 via a check valve 22. In the usual manner the hydrodynamic brake 90 circulates the brake fluid through the heat exchanger 19. In this embodiment, the feedback is provided by a line 30 communicating with the stator chamber 23 and in series with a pressure transformer 29 while communicating with chamber 25b″ to deliver a fluid pressure to the master cylinder which represents the torque applied by the decelerator 90 to the rear wheel.

When the brake pedal 17 is depressed, apart from delivering brake fluid to the front and rear wheel brakes in the usual manner, it closes contacts 17b and 17c to actuate valve 18 which previously maintained communication between the hydrodynamic brake 90 and the return reservoir 20 so that brake fluid was drained from the hydrodynamic brake, thereby preventing deterioration of the fluid or drag in the power train. When the contacts are closed, however, the return line 20a is blocked and the pressure accumulator 16 is connected to the hydrodynamic brake, thereby charging the latter and applying increased brake torque to the rear wheels. As indicated earlier, the pressure developed in chamber 25b″ is proportional to this torque and is applied to the face 25b of the stepped piston 25. As the brake pedal 17 is depressed, an equilibrium is rapidly attained in which the pressures on both sides of the piston 25 are equal so that the following relationship can be ascertained: $P_{26a} = P_{25a'} + P_{25b''}$ where $P_{26a}$ is the pressure on piston 26 in chamber 26a, $P_{25a'}$ is the pressure in chamber 25a′ applied to the surface 25a and $P_{25b''}$ is the pressure on surface 25b in chamber 25b″. This relationship can be transposed to $P_{25a'} = P_{26a} - P_{25b''}$, thereby demonstrating that the cylinders of the rear-wheel brakes are operated with a pressure equal to the difference between the front-wheel brake pressure and a pressure corresponding to the brake moment applied by the hydrodynamic brake 90.

Figure 4:
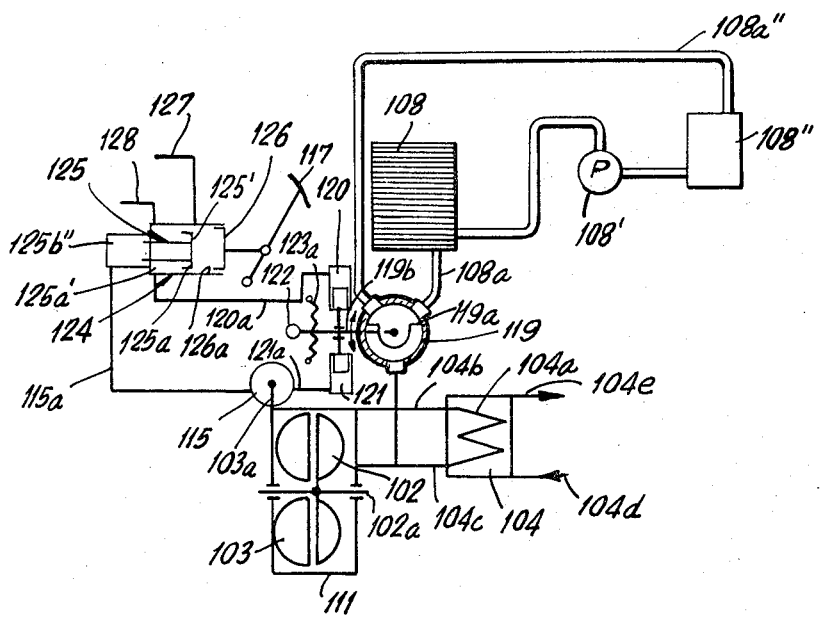
FIG. 4 is a diagram of a modified system having means for differentially controlling this valve.

In FIG. 4, I show a modified system designed to increase the reaction time of the brake system and prevent delivery in the compensation of the rear-wheel brake pressure in accordance with the difference between the front-wheel brake pressure and the pressure attributable to the hydrodynamic brake. In this embodiment, the hydrodynamic brake 101 is shown to have a stator 103 which cooperates with the motor 102 connected to the cardan or power shaft via the rotor shaft 102a. The circulating system of the hydrodynamic brake is constituted by a heat exchanger 104 whose coil 104a is connected in series with the lines 104b and 104c respectively leading the heated brake fluid from the hydrodynamic brake 101 and returning the cool fluid thereto. The outer chamber of the heat exchanger 104 is connected in series via an inlet 104d and an outlet 104e with the water-circulating cooling system of the internal combustion engine of the vehicle (see my aforementioned copending application).

For charging the hydrodynamic brake system with fluid, I provide a vessel 108 which may be connected with a compressed air tank or a pump system as illustrated in FIGS. 1 and 3. As has been described in connection with FIGS. 1 and 2, the stator 103 has a limited angular mobility and cooperates via an arm 103a with a servo-transmitting cylinder 115 whose output is connected via line 115a to a chamber 125b″ of the tandem master cylinder 124.

As has been described in connection with FIG. 3, the brake pedal 117 of this embodiment operates a master-cylinder piston 126 which is shiftable in a working compartment 126a and applies pressure to the large-diameter step 125′ of a stepped piston 125. The large-diameter step disposed to the pressure in chamber 126a has a surface area equal to that of piston 126. The annular face 125a of the stepped piston derives fluid from the chamber 125a′ and forces it through the transmission line 128 to the wheel brakes of the driven wheels. From chamber 126a, the brake fluid is delivered via line 127 to the nondriven set of wheels. In this embodiment, as in the system of FIG. 3, the feedback pressure from cylinder 115 as produced by the torque by the stator 103 (see the servo transmitter 14 in FIG. 1) serves to control the pressure upon the rear-wheel brakes. The pressure applied at line 128 to the rear-wheel brakes is thus determined by the relationship $P_{125a'} = P_{126a} - P_{126b''}$ where the samples have the significance previously described. Here, however, a hydraulically actuated control valve 119 is provided and is operated by a pair of oppositely effective actuating cylinders 120 and 121. The coupling between the cylinders 120 and 121 and the valve member 119a of the valve is represented at 119b. Cylinder 20 is connected with the brake network 128 of the driven wheels by a line 120a while the cylinder 21 is connected by a line 121a with the servo transmitter 115. At 122, I show a lever biased into an intermediate position by springs 122a and which is coupled with the shaft 119b of the valve 119.

When the brake pedal 117 is depressed to actuate the brake system, pistons 126 and 125 are displaced to the left (FIG. 4) to activate the networks 127 and 128 and supply fluid to the front-wheel and rear-wheel brake cylinders. Correspondingly, cylinder 120 is supplied with fluid to rotate the shaft 119b and swing the valve member 119a to permit filling of the hydrodynamic brake 101 by the charging vessel 108, which may receive fluid from a pump 108′ whose reservoir is represented at 108″ and is connectable with the hydrodynamic brake 101 by the two-way valve 119. As a result of the increased filling of the hydrodynamic brake 101 with the liquid, the brake moment applied to the driven wheels of the vehicle by the rotor 102 correspondingly increases as does the torque upon the stator 103. The piston of the servo transmitter 115 is displaced by the torque acting on arm 103a to force fluid under pressure via line 121a to the other actuating cylinder 121 until the valve 119 is swung in the opposite sense to its intermediate position with the cylinders 120 and 121 again in balance. In this position of the valve, illustrated in FIG. 4, the supply line 108a from charging vessel 108 and the return line 108a″ are both cut off and hydrodynamic braking continues with circulation of the heated fluid through the heat exchanger 104. The result is a pressure equalization in the brake system corresponding to the effectiveness with the hydrodynamic brake. Since the cylinders 120 and 121 are in balance, the contribution of each of these rear-wheel brake systems is maintained constant regardless of the degree of depression of the brake pedal. When the brake is released, the pedal 117 swings to the right whereby the pressure in networks 127 and 128 falls together with a sharp drop of pressure in cylinder 120 by comparison with the pressure in cylinder 121. The valve 119 is shifted to drain the hydrodynamic brake 101; upon complete discharge of the hydrodynamic brake, valve 119 is returned to its idle position as pressure balance is restored between lines 120a and 115a. Lever 122 may be shifted in either direction to increase or decrease the hydrodynamic brake effectiveness.

Figure 5:
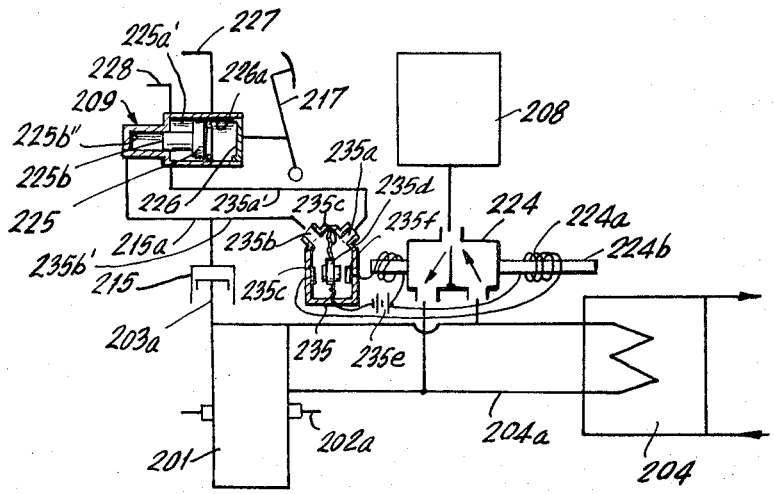
FIG. 5 is a diagram of still another embodiment, using a two-compartment differential switch.

FIG. 5 shows another arrangement wherein the electromagntic control valve is of a somewhat different construction. Here the hydrodynamic brake 201 has a rotor shaft 202a connected in the drive train of the vehicle and is provided with a circulating network 204a including a heat exchanger 204 as previously described. The brake pedal 217 displaces a piston 226 of a tandem master cylinder 209 whose chamber 226a is connected by line 227 with the brake cylinders of the nondriven wheels. Ahead of the piston 226, I provide a stepped piston 225 whose large step displaces fluid in chamber 225a' to a line 228 while its other step 225b is subjected to feedback pressure in chamber 225b''. The feedback pressure is generated by the servotransmitter cylinder 215 via line 215a which senses the reaction torque of the stator whose arm is shown at 203a. The means for charging the hydrodynamic brake 201, which may correspond to any of the systems heretofore described or shown in the aforementioned copending application and patents, is represented generally at 208, the control being effected by an electromagnetic valve 224 shown in its neutral position in which it is held by springs not illustrated. In this position, the fluid flow to and from the charging device 208 is cut off and any fluid within the circulating system 204a passes along a closed path.

The pressure-sensing means responsive to a predetermined balance between hydrodynamic-brake effectiveness and rear-wheel brake force is here formed as a pressure switch 235 whose diaphragm 235c carries contacts 235d connected to one pole of a battery 235e. Each of the chambers 235a and 235b is provided with a respective countercontact 235f and 235g which is returned via respective solenoid coils 224a and 224b to the other pole of the battery. Chamber 235a is connected by line 235a' with the master cylinder in chamber 225a' supplying the brake cylinder of the driven wheels while chamber 235b is connected by line 235b' with the servotransmitting cylinder 215. In operation, the system of FIG. 5 functions similarly to that of FIG. 4. Thus an imbalance in the contributions of the hydrodynamic brake 201 (as sensed by the cylinder 215) and the brake force of the rear-wheel friction brakes as represented by the pressure in chamber 225a will be sensed by the pressure responsive switch 235 to operate valve 224 and restore the balance as has been discussed in connection with FIG. 4.

Figure 6:
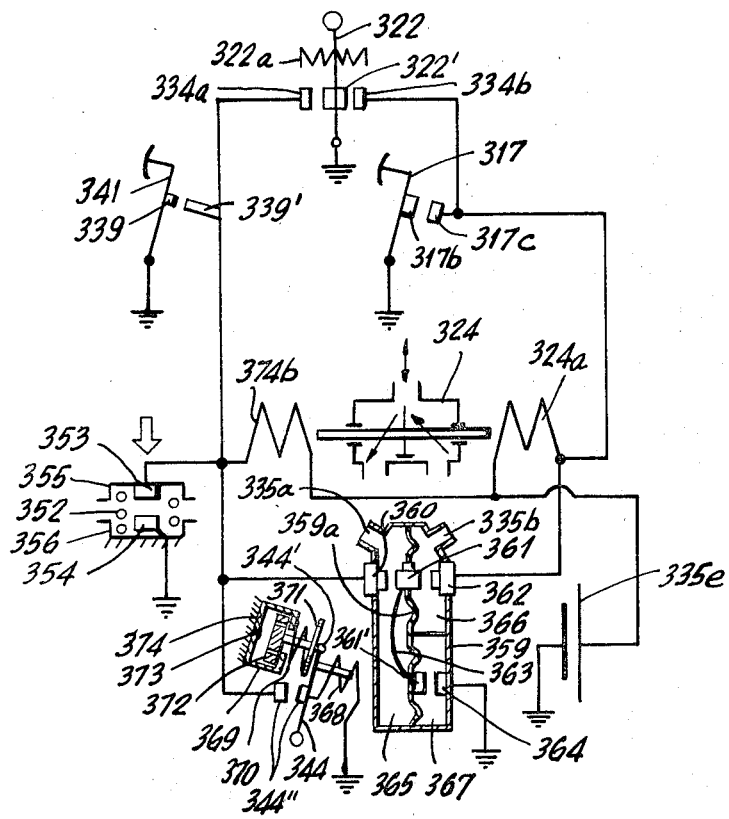
FIG. 6 is a diagram of a circuitry of yet another hydrodynamic brake system.

FIG. 6 shows a system functionally similar to that of FIG. 5 wherein the valve 324 is connected between the hydrodynamic brake and its charging system as illustrated in FIG. 5. In this embodiment, however, a three-chamber pressure-responsive switch 359 is provided, the switch being subdivided into three chambers represented at 365, 366 and 367. The diaphragm 359a here carries a double-acting contact 351 electrically connected by a wire 363 with a single-acting contact 361'. In the chamber 365, which communicates via port 335a with the master cylinder chamber communicating with the rear-wheel brake cylinders, the countercontact 360 is mounted in the fixed wall with the switch 359. In the chamber 366 opposite chamber 365, the countercontact cooperating with the contact 361 is represented at 362 and is similarly fixed to the wall of the pressure-responsive switch 359. At 335b, this latter chamber is connected with the servo-transmitting cylinder which may be of the type illustrated at 215 in FIG. 5. The contacts 361 and 362 are adapted to closed circuits between ground (to which the contact 364 opposite diaphragm contact 361' is connected) in series with a coil 324a of the electromagnetic valve 324 and the positive terminal of a battery 335b whose negative side is grounded. A similar circuit can be closed between the positive terminal of battery 335e, the other solenoid coil 324b, the contacts 360 and 361 and the contacts 361', 364 to ground. Chamber 365 bridges both chambers 366 and 367, the latter being hermetically sealed to form an air cushion. Upon actuation of the brake pedal 317, the contact 217b engages a countercontact 317c and connects the grounded side of coil 324a to the ground potential of the battery, and the valve 342 is thus operated to deliver brake fluid from the charging vessel to the hydrodynamic brake. Upon release of the brake pedal, the hydrodynamic brake remains effective since switch 364 has not yet been closed.

Upon actuation of the brake pedal 317 beyond its play to operate the friction brakes, the master cylinder (e.g. the master cylinder 225 of FIG. 5) is actuated to force brake fluid to the rear-wheel brake cylinders and, simultaneously, to apply pressure to the chamber 365 and close the contacts 361', 364. Switch 317b, 317c is a snap or trip switch which remains closed until it is stepped again by the pedal 317. The control of the hydrodynamic brake is now fully automatic until the gas pedal 341 is actuated. The automatic operation is similar to that of FIG. 5 so that, in the event of pressure differential against the diaphragm 359a indicative of a higher pressure in the chamber connected with the rear-wheel brake cylinders, contacts 361', 364 and 361, 362 remain closed to continue the filling of the hydrodynamic brake. As the hydrodynamic brake effectiveness increases, the torque delivered to the servo-transmitting cylinder increases the pressure within the corresponding chamber 335a, 366 to brake the circuit at contact 361, 362. The balance is maintained by alternate engagement of the contact 361 with the contact 360 or 362 with corresponding operation of the valve 324 to drain or feed the hydrodynamic brake. The disengagement of the hydrodynamic brake is effected upon depression of the gas pedal 341 whose contact 339 engages the count contact 338' which may be a strip contact cooperating with the wiper 339 over the entire gas pedal stroke. The left side of coil 324b is thus connected to ground and consequently energized to shift the valve 324 and drain fluid from the hydrodynamic brake.

In addition, a manual operation of the hydrodynamic brake is possible via the lever 322 which is centered by springs 322a and carries a contact 322' selectively engageable with contacts 334a and 334b which are in parallel with the contacts 339, 339' and 317b, 317c, respectively. When the lever 322 is swung to the right, it energizes coil 324a to place in operation the hydrodynamic brake. Conversely, a movement of the lever 322 to the left energizes coil 324b to drain the hydrodynamic brake.

A bimetallic switch 344 closes upon the development of excess engine temperature indicative of an overheated condition of the engine cooling system in which the hydrodynamic braking heat is dissipated as described in my aforementioned copending application Ser. No. 672,121. The bimetallic switch 328 can be disposed directly in the liquid/liquid heat exchanger (e.g. heat exchanger 4 of FIG. 5). An electromagnetic coil 368 operates the armature 344' of the bimetallic switch and serves to open circuit the contact 344'' whereby the contacts can close only upon elapse of a predetermined time interval established by the time-delay mechanical damper represented at 369. This damper comprises a spring 370 retained between a piston 372 and a plate 71, the latter bearing upon the armature 344' of the bimetallic switch and being shiftible relatively to the piston. The piston 372 is guided in a housing 374 and has throttle bores 373 effective when the spring urges the piston 372 connected with the armature to the left, i.e. in the switch-closing direction. This arrangement avoids excessive speed in draining the hydrodynamic brake to restore a proper operating temperature in the cooling system. In other words, when the temperature in the cooling system rises above a predetermined level, switch 314'' is closed by the movement of the armature 344' to the left under the bending action of the bimetallic strip. The switch does not, however, close instantly since its motion is restricted by the dashpot damper constituted at 372, 374. When the switch 344'' closes, however, it connects coil 324b to ground and drains momentarily some of the fluid from the hydrodynamic brake, thereby decreasing the braking action and the heat which must be dissipated by the cooling system. Such draining has the effect of creating an imbalance at the pressure-responsive switch 359 which compensates in the manner previously described. Coil 368 is simultaneously energized to draw the contacts 344" into their open position, whereupon coil 368 cuts off and, if the overheated condition is maintained, this cycle is repeated to drain additional incremental quantities of fluid from the system.

To protect the differential and the drive shaft from overloading, a further contact arrangement is provided as shown at 355 and 356. This arrangement diagrammatically represents a pair of suspension seats 355 and 356 for a suspension spring 352 designed to hold the seats 355 and 356 apart. The seats carry contacts 353 and 354, respectively, in circuit with the coil 324b and ground. With increasing vehicle load, switch contacts 353 and 354 close and coil 324b is energized to drain brake fluid from the hydrodynamic brake so that excessive braking torque does not combine with loading at the wheels to cause damage to the power train.

I claim:

1. In a brake system for an automotive vehicle having an engine, a power train connected with said engine and including a power shaft, a set of driven wheels operatively connected with said power shaft, a further set of wheels, first and second sets of mechanical-friction hydraulically operable wheel brakes operatively associated with said driven set and said other set of wheels, respectively, and master-cylinder means for delivering fluid under pressure to said first and second sets of wheel brakes, the improvement which comprises a hydrodynamic brake operatively connected with said shaft for restricting the rotation thereof upon the delivery of hydraulic fluid thereto and applying a brake moment representable as a fluid pressure to said set of driven wheels; and means responsive to the fluid pressure supplied to said second set of wheel brakes and to the fluid pressure representative of said brake moment of said hydrodynamic brake for applying a brake pressure to said first set of wheel brakes proportional to the difference between the fluid pressure at said second set of wheel brakes and the fluid pressure representative of said brake moment.

2. The improvement defined in claim 1 wherein said hydrodynamic brake has a rotor rotatably entrained by said shaft, a stator co-operating with said rotor for pumping a hydraulic fluid supplied to said hydrodynamic brake along a closed path, and a heat exchanger along said path for dissipating hydrodynamic braking heat developed by said hydrodynamic brake from the fluid circulated along said path.

3. The improvement defined in claim 2 wherein said stator has limited angular mobility and develops a torque proportional to the brake moment applied by said hydrodynamic brake to said driven wheels, the last-mentioned means including a servo transmitter connected with said stator for translating said torque into said fluid pressure representative of said brake moment.

4. The improvement defined in claim 2 wherein said rotor and said stator form a chamber sustaining a fluid pressure proportional to said brake moment, the last-mentioned means including a tube communicating with said chamber.

5. The improvement defined in claim 2 wherein the last-mentioned means includes a valve connected between said master-cylinder means and said first set of wheel brakes and having a valve member displaceable in response to said fluid pressure representative of said brake moment.

6. The improvement defined in claim 2 wherein said master-cylinder means includes a cylinder bore, a first piston shiftable in said bore under the control of a vehicle operator and delivering brake fluid to said second set of wheel brakes, and a stepped piston exposed to the pressure delivered to said second set of wheel brakes while having a first step exposed to the pressure applied to said first set of wheel brakes and a second step exposed to said fluid pressure representative of said brake moment.

7. The improvement defined in claim 2 wherein the last-mentioned means includes a fluid-pressure transformer.

8. The improvement defined in claim 2, further comprising a charging device for supplying hydraulic fluid to and removing it from said hydrodynamic brake, and differentially operable control means responsive to the fluid pressure at said first set of wheel brakes and to said fluid pressure representative of said brake moment for operating said device.

9. The improvement defined in claim 8 wherein said device includes valve means shiftable from a neutral position in which fluid flow between said device and said hydrodynamic brake is cut off to respective operative positions wherein fluid is drained from said hydrodynamic brake and fluid is supplied to said hydrodynamic brake respectively.

10. The improvement defined in claim 9 wherein said differentially operable control means includes a pair of oppositely effective piston-and-cylinder arrangements acting upon said valve member in opposite senses and respectively responsive to the fluid pressure of said first set of wheel brakes and to the fluid pressure representative of said brake moment.

11. The improvement defined in claim 9 wherein said differentially operable control means includes differentially operable switch means, electromagnetic means for shifting said valve member and circuit means connecting said switch means with said electromagnetic means.

12. The improvement defined in claim 11 wherein said differentially operable switch means includes a housing subdivided by a yieldable partition into a pair of chambers respectively pressurized with said fluid pressure representative of said brake moment and the fluid pressure supplied to said first set of wheel brakes, a double-acting contact carried by said partition and fixed contacts mounted in said chambers for alternate engagement with said double-acting contact, said electromagnetic means including a pair of coils each connected in circuit with a power source, said double-acting contact and a respective one of the counter contacts in the respective chamber.

13. The improvement defined in claim 12 wherein said switch means includes a sealed further chamber formed by said partition, said partition carrying a single-acting contact, said further chamber being provided with a counter contact co-operating with said single-acting contact upon increase of the pressure in said first set of wheel brakes for completing the circuits of said coils.

14. The improvement defined in claim 11 wherein the vehicle has an accelerator control, further comprising contact means on said control, connected in said circuit means for shifting said valve member to drain fluid from said hydrodynamic brake prior to substantial acceleration of said power shaft.

15. The improvement defined in claim 11 wherein said vehicle has a brake pedal for operating said master-cylinder means, further comprising contact means connected in said circuit means for energizing said electromagnetic means to shift said valve member and charge said hydrodynamic brake with fluid prior to the activation of said differentially operable switch means.

16. The improvement defined in claim 2 wherein said automotive vehicle has a water-circulation cooling system in heat-receiving relationship with said heat exchanger, further comprising thermostat means responsive to the temperature of the water circulating through said cooling system and operatively connected with said hydrodynamic brake for incrementally discharging fluid therefrom upon the temperature in said cooling system rising above a predetermined level.

17. The improvement defined in claim 1, further comprising operator-controlled means for selectively discharging and charging said hydrodynamic brake with fluid independently of the operation of said means responsive to fluid pressure.

18. The improvement defined in claim 1, further comprising means responsive to the load of said vehicle operatively connected with said hydrodynamic brake for discharging fluid therefrom upon an increase in the load carried by said vehicle beyond a predetermined level.

References Cited

UNITED STATES PATENTS 3,122,220  2/1964  Hoffstrom _____ 188—86 XR
3,265,162  8/1966  Botterill _____ 303—2

MILTON BUCHLER, *Primary Examiner.*

J. J. McLAUGHLIN, *Assistant Examiner.*

U.S. Cl. X.R.

188—86, 90; 303—6